3,210,261
CONTINUOUS ANALYZER
Carl P. Tyler, Baytown, Tex., assignor, by mesne assignments, to Esso Research and Engineering Company, Elizabeth, N.J., a corporation of Delaware
Filed May 12, 1961, Ser. No. 109,663
3 Claims. (Cl. 204—195)

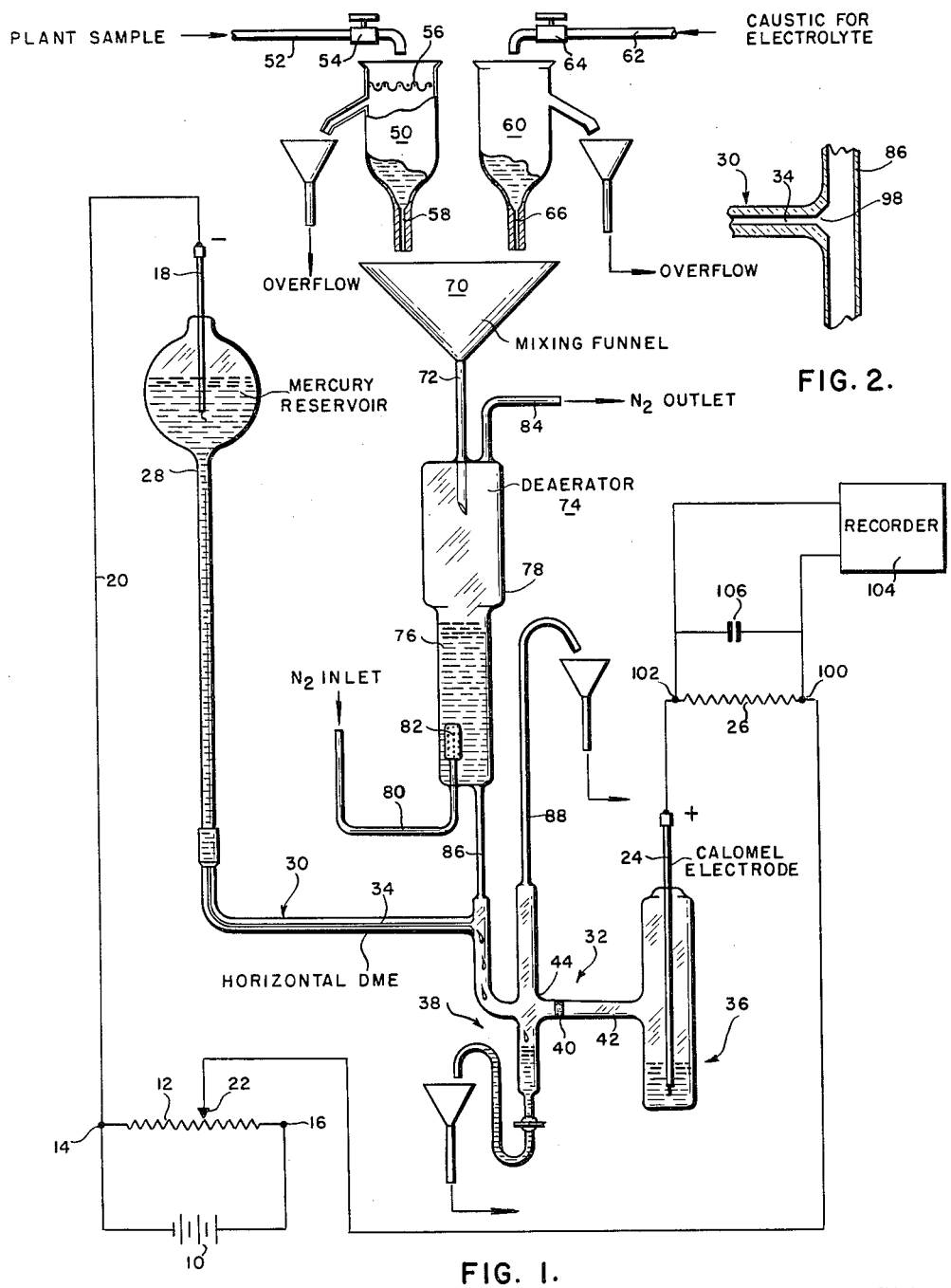

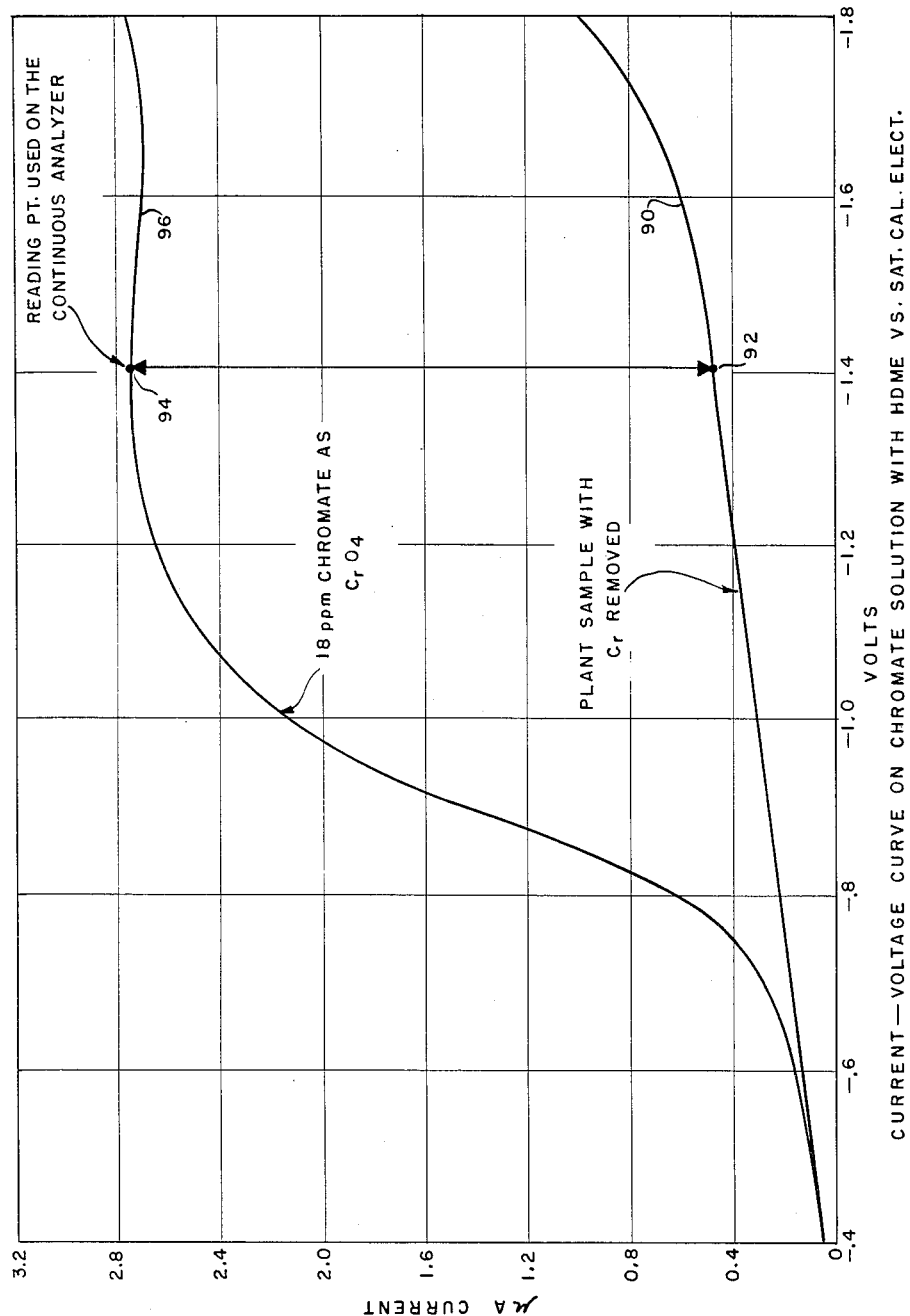

This invention relates to continuous analyzers. More particularly, this invention relates to the determination of the chromate content of circulating water systems such as the circulating water used in cooling systems.

The usual method of determining the chromate residual in circulating water systems is to manually determine the chromate residuals. This manual determination is accomplished by process operators. Prior to this invention, no satisfactory commercially available instrument for the continuous recording and controlling of chromate residuals in water systems had been developed.

It would be highly desirable if a system and method are available which are simple, efficient and automatic. The method and apparatus to be described herein satisfy all of these requirements.

Briefly described, the process includes taking a water sample from the plant, such as a cooling tower, and mixing the water sample with a predetermined amount of electrolyte, such as caustic. The oxygen is then removed from the mixed solution. The deoxygenated mixed solution is flowed to an electrolysis cell. The electrolysis cell includes a reference electrode, such as a calomel electrode, and a dropping mercury electrode. The deoxygenated mixed solution is flowed through the dropping mercury electrode section of the cell while mercury droplets are dropped at a predetermined rate into the flowing deoxygenated mixed solution. If sufficient voltage, say —1.4 volts, is applied to the cell circuit, an electrical current is generated which has a magnitude related to the amount of chromate in the deoxygenated mixed solution. An indication of the electrical current is obtained. This indication may be obtained directly by connectng a microammeter in series in the cell circuit or indirectly by directing the current through a standard resistance and recording the potential drop across this resistance with a recording potentiometer. This potential drop can be calibrated in terms of parts per million chromate.

The invention also includes a new and improved apparatus for carrying out the new process.

The invention as well as its many advantages will be further understood by references to the following detailed description and drawings in which:

FIG. 1 is a schematic flow diagram illustrating one preferred method and system for determining the chromate content in cooling tower waters;

FIG. 2 is an enlarged sectional view showing the structure of the outlet portion of the dropping mercury electrode;

FIG. 3 is a current-voltage graph illustrating the functional relationship of the current developed across the cell with increasing voltages across the cell.

Figure 4:
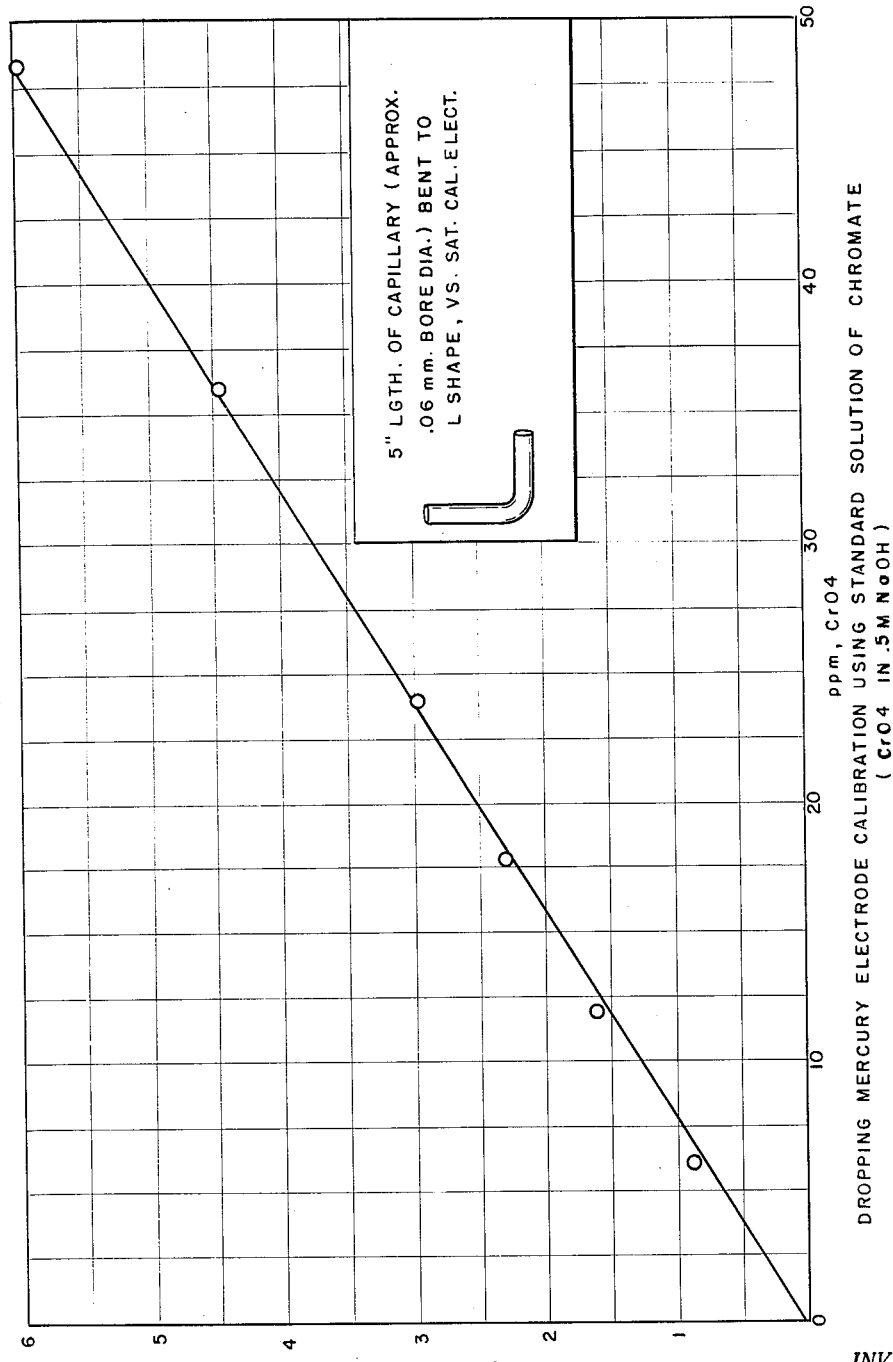
FIG. 4 is a current-p.p.m. CrO4 graph showing the linear relationship of the current developed across the cell with respect to the p.p.m. of CrO4 in the sample being measured.

Referring to the drawings and more particularly to FIG. 1, my new system for analyzing the chromate content of circulating waters includes an electrical circuit for applying a voltage across a dropping mercury electrode-calomel electrode cell. The electrical circuit includes a voltage source such as a battery 10. A resistor 12 is connected across the end terminals 14 and 16. The negative terminal 14 of the battery 10 is connected to an electrode 18 by means of electrical lead 20. A predetermined voltage is applied across the dropping mercury electrode-calomel cell by means of a variable voltage tap 22 which can be adjusted along the resistor 12 to apply the desired voltage across the dropping mercury electrode-calomel cell. Tap 22 is connected to the calomel electrode 24 through a standard resistor 26. The calomel electrode 24 is of a low-resistance type.

The electrical circuit also includes the mercury reservoir 28, the L-shaped capillary tube 30 and the dropping mercury electrode-calomel electrode cell indicated generally by the numeral 32. The horizontal portion 34 of L-shaped capillary 30 is connected to the cell 32 so as to cause discrete droplets of mercury to flow downwardly within the cell 32. These droplets of mercury constitute the dropping mercury electrode of the cell 32.

The chromate content of the samples is determined electrochemically. If a mixture of sample and electrolyte is flowed through the cell 32, the chromate is reduced at the dropping mercury electrode according to the reaction:

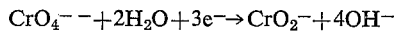

$$CrO_4^{--}+2H_2O+3e^- \rightarrow CrO_2^-+4OH^-$$

FIG. 3 indicates a means of predetermining the amount of constant voltage to apply to the cell circuit in order to be on the plateau of the current curve. For instance, a constant voltage source of —1.4 volts or —1.5 volts would be satisfactory.

The dropping mercury electrode-calomel electrode cell 32 is separated into a reference electrode section 36 and a dropping mercury electrode section 38 by means of a porous fritted glass or ceramic disk 40 mounted transversely in the horizontal member 42.

The reference electrode section 36 is filled with an electrolyte such as saturated KCl solution. A KCl-Agar bridge in section 42 completes the electrical circuit from the dropping mercury electrode section 44 of cell 32 to the calomel electrode 24.

The fritted ceramic disk 40 prevents contamination of the calomel electrode 24 by diffusion of the sample into the calomel reference electrode section 36.

The cooling tower water sample is fed to a sample metering container 50 through a liquid conduit 52 controlled by valve 54. The sample is flowed from the conduit 52 through a screen 56 mounted across the upper portion of metering container 50. A predetermined rate of flow of sample from the metering container 50 is flowed from the capillary 58 in the bottom of metering container 50.

The electrolyte, such as caustic, is flowed into an electrolyte metering container 60 by means of a fluid conduit 62 controlled by valve 64. A predetermined rate of flow of electrolyte from the electrolyte metering container 60 is controlled by capillary 66 in the bottom of electrolyte metering container 60.

If desired, the metering containers 50 and 60 may be replaced by low-output metering pumps.

The range of flow of sample and the range of flow of electrolyte are not particularly critical. If NaOH is used as the electrolyte, the concentration of NaOH may range anywhere from .1 to 1.0 N. If .1 N of NaOH is used, one drop of NaOH will flow from capillary 66 for each ten drops of cooling tower water through capillary 58.

The sample and electrolyte are mixed in a mixing funnel 70, and the mixed solution is fed through line 72 to an oxygen remover or deaerator 74. The oxygen must be removed from the mixed solution because with the system described, oxygen is reduced at the dropping mercury electrode at an applied voltage approximately the same as the applied voltage at which the chromate is reduced. Hence, the oxygen if not removed would interfere with the determination of the chromate content.

The deaerator 74 is substantially tubular in shape and includes a lower portion 76 and an upper portion 78 of increased cross section.

Nitrogen has been found to be a particularly good deoxygenating agent. A high purity nitrogen must be used. A nitrogen inlet conduit 80 extends upwardly through the bottom of deaerator 74 and into the interior of the smaller portion 76 of deaerator 74. The nitrogen conduit 80 terminates in a nitrogen outlet 82. The outlet 82 has holes formed therein so that nitrogen can flow from the holes upwardly through the mixed solution in deaerator 74.

A nitrogen outlet 84 leads outwardly from the top of deaerator 74. The larger section 78 of deaerator 74 prevents the foaming of the nitrogen within the mixed solution and the overflowing of the mixed solution from outlet 84. Foaming would occur if the deaerator 74 were the same diameter throughout its length.

The deaerator 74 is connected to the sample inlet of the dropping mercury electrode section 44 of cell 32 by means of a sample flow conduit 86 extending into the bottom of the lower portion 76 of deaerator 74. Tube 86 terminates within lower portion 76 of deaerator 74 at a point below the nitrogen outlet 82. With this structure the mixed solution flowing from deaerator 74 is free of any nitrogen bubbles which would interfere with the determination of the chromate content of the mixed solution.

The residence time of the mixed solution in the deaerator 74 should be sufficiently long to completely remove the oxygen from the mixed solution but yet not so long as to unduly interfere with the sensitivity of the system. A residence time of from 5 to 10 minutes is preferred.

The mixed solution flowing through tube 86 flows in the same direction as the flow of mercury droplets from mercury dropping electrode 34 and into the mercury dropping electrode section 44 of the cell 32. The sample flows from the section 44 of cell 32 by means of a mixed solution outlet 88.

The cooling tower water will contain other reducible elements. The effect of these other reducible elements may be obtained by measuring the current developed across the cell with chromate removed from the sample by barium chloride. The curve thus obtained will look like curve 90 in FIG. 3.

Thereafter, if, say $-1.4$ volts are applied across the cell, the actual current due to chromate reduction if 18 p.p.m chromate are in the sample, is equal to the voltage between point 92 on curve 90 and point 94 on curve 96. Actually, any voltage which would produce a current lying on the flat portion of the curve 96 may be applied across the electrical circuit.

FIG. 4 shows the linearity of current with respect to p.p.m. $CrO_4$ using a standard solution of chromate ($CrO_4$) in .5 M NaOH.

As shown in FIG. 2, the capillary tube 34 of the dropping mercury electrode is flared outwardly at 98 to provide a larger opening at the point where the mercury drops flow into sample inlet 86. The flared portion, it has been found, keeps the end of the capillary 34 from getting contaminated. It also allows you to obtain a bigger mercury drop with the same rate of flow of mercury through capillary tube 34 than can be obtained if the end of the capillary tube 34 were not flared. Thus, a larger electrical current is obtained with the same rate of flow of mercury than is obtained if the capillary tube 34 is not flared.

In operation, a voltage which is sufficiently high to provide a current falling on the flat portion of curve 96 in FIG. 3 is applied across the mercury electrode-calomel cell 32. This voltage may be, say $-1.4$ volts. The sample of cooling tower water is mixed in the proper ratio with the electrolyte and fed to the deaerator 74. The oxygen from the resulting mixed solution is removed from the mixed solution by the nitrogen bubbling through the deaerator 74. After the oxygen has been removed from the mixed solution, the mixed solution is fed to the dropping mercury electrode portion 44 of cell 32; and mercury droplets from capillary tube 34 are dropped into the solution at a rate of, say one drop per second. The electrical current flowing through the electrical system is proportional to the chromate content of the mixed solution. Thus, a current flows through resistor 26 which is proportional to the chromate content of the mixed solution. The voltage developed across points 100 and 102 is proportional to the current flowing through resistor 26. This voltage is recorded on chart recorder 104.

It has been found that under some circumstances as the mercury drops build up on the end of capillary tube 34 and then fall off, oscillations in electrical current through resistor 26 occur which results in an oscillation of the recording stylus located on chart recorder 104. The effects of these oscillations on the chart recorder 104 can be eliminated by the provision of a by-pass capacitor 106.

I claim:

1. A continuous analyzing system comprising: a mercury electrode-reference electrode cell including a porous member separating the cell into a reference electrode section filled with an electrolyte, and a dropping mercury electrode section having a sample inlet, a sample outlet, and a dropping mercury electrode mounted as as to drop discrete droplets of mercury in the same direction as the flow of sample through the dropping mercury electrode section when a sample is flowed therethrough; a deaerator connected to the sample inlet which has a larger cross-section in its upper portion, and having an inlet extending upwardly into its lower smaller cross-sectional portion to a point above the sample inlet and having an outlet in the upper portion; means for feeding a sample-electrolyte mixed solution to said deaerator; and an electrical circuit including a voltage source, said mercury electrode-reference electrode cell, a capacitor and a resistor in parallel across which the voltage is measured, and a recorder for recording the voltage.

2. A system in accordance with claim 1 wherein said means for feeding the sample-electrolyte mixed solution to the deaerator includes means for metering the relative amounts of sample and electrolyte in the mixed solution.

3. A continuous analyzing system comprising: a mercury electrode-reference electrode cell including a porous member separating the cell into a reference electrode section filled with an electrolyte, and a dropping mercury electrode section having a sample inlet, a sample outlet, and a dropping mercury electrode mounted so as to drop discrete droplets of mercury in the same direction as the flow of sample through the dropping mercury electrode section when a sample is flowed therethrough; a deaerator connected to the sample inlet which has a larger cross-section in its upper portion, and having an inlet extending upwardly into its lower smaller cross-sectional portion to a point above the sample inlet and having an outlet in the upper portion; means for feeding a sample-electrolyte mixed solution to said deaerator; and an electrical circuit including a voltage source, said mercury electrode-reference electrode cell, and means including a recorder for obtaining an indication of the electrical current in said electrical circuit.

References Cited by the Examiner

UNITED STATES PATENTS

| | | | |
|---|---|---|---|
| 2,343,885 | 3/44 | Coleman | 204—195 |
| 2,361,295 | 10/44 | Kanner et al. | 204—195 |
| 2,500,284 | 3/50 | Heyrovsky | 204—195 |
| 2,708,657 | 5/55 | Ladisch | 204—195 |
| 2,745,803 | 5/56 | Leveque | 204—195 |
| 2,870,078 | 1/59 | Hood | 204—195 |
| 2,962,432 | 11/60 | Tyler | 204—195 |

(Other references on following page)

FOREIGN PATENTS 74,347   6/52   Denmark.
631,403  11/49  Great Britain.
853,326  11/60  Great Britain.

OTHER REFERENCES

Kolthoff et al.: "Polarography" 2nd. ed., 2 vols., 1952.

Milner: "The Principles & Applications of Polarography and other Electroanalytical Processes," 1957.

Meites: "Polarographic Techniques," 1955.

WINSTON A. DOUGLAS, *Primary Examiner*.

JOHN R. SPECK, MURRAY TILLMAN, JOHN H. MACK, *Examiners*.